United States Patent
Klotz (10) Patent No.: US 11,498,782 B2
(45) Date of Patent: Nov. 15, 2022

(54) ROBOTIC PALLETIZING (71) Applicant: SIDEL CANADA INC., Laval (FR)

(72) Inventor: Franck Klotz, Laval (CA)

(73) Assignee: SIDEL CANADA INC, Laval (CA)

(*) Notice: Subject to any disclaimer, the term of this patent is extended or adjusted under 35 U.S.C. 154(b) by 0 days.

(21) Appl. No.: 16/474,115

(22) PCT Filed: Dec. 30, 2016

(86) PCT No.: PCT/IB2016/001931
§ 371 (c)(1),
(2) Date: Jun. 27, 2019

(87) PCT Pub. No.: WO2018/122568
PCT Pub. Date: Jul. 5, 2018

(65) Prior Publication Data
US 2019/0352107 A1 Nov. 21, 2019

(51) Int. Cl.
*B65G 57/22* (2006.01)

(52) U.S. Cl.
CPC ...... *B65G 57/22* (2013.01); *B65G 2814/0305* (2013.01)

(58) Field of Classification Search
CPC ........ B65G 61/00; B65G 57/22; B65G 57/00; B65G 2814/0305; Y10S 414/106; Y10S 414/107; Y10S 414/108
See application file for complete search history.

(56) References Cited

U.S. PATENT DOCUMENTS

| | | | | |
|---|---|---|---|---|
| 2,858,043 A | * | 10/1958 | Fenton | B65G 59/062 221/9 |
| 3,023,916 A | * | 3/1962 | Purse | B65G 57/00 414/788 |
| 3,023,926 A | | 3/1962 | Purse | |
| 3,273,751 A | * | 9/1966 | De Wees | B65G 59/066 221/281 |
| 3,743,112 A | | 7/1973 | Cooley | |
| 3,946,880 A | * | 3/1976 | Schmitt | B65G 59/08 414/795.9 |
| 4,541,762 A | * | 9/1985 | Tischler | B23Q 7/04 414/416.07 |
| 4,642,014 A | * | 2/1987 | Saarinen | A01G 9/088 193/35 SS |
| 4,743,154 A | * | 5/1988 | James | B23P 19/041 198/412 |

(Continued)

FOREIGN PATENT DOCUMENTS

CA 2215759 A1 * 3/1999 ........... B65G 59/063

OTHER PUBLICATIONS

International Search Report dated Apr. 19, 2017 for PCT/IB2016/001931.

*Primary Examiner* — Gregory W Adams (57) ABSTRACT

The subject matter of the invention is a palletization device (1) comprising a freely accessible multiaxial robot (3) for gripping and moving the products (2) to be palletized and, at least one station (5) arranged on the ground, for receiving the pallets (4) on which the products (2) are deposited, which device is characterized in that the at least one station (5) is designed to receive and to position-reference a stack (6) of pallets (4) one above the other. A further subject matter of the invention is a corresponding method.

15 Claims, 2 Drawing Sheets

(56) References Cited

U.S. PATENT DOCUMENTS

| | | | | |
|---|---|---|---|---|
| 4,979,870 A | * | 12/1990 | Mojden | A61L 2/18 |
| | | | | 414/788.4 |
| 5,096,369 A | * | 3/1992 | Ouellette | B65G 60/00 |
| | | | | 414/796.4 |
| 5,158,424 A | * | 10/1992 | Mojden | A61L 2/18 |
| | | | | 414/799 |
| 5,225,691 A | * | 7/1993 | Powers | H01L 21/67265 |
| | | | | 250/559.4 |
| 5,607,278 A | * | 3/1997 | Mojden | A61L 2/18 |
| | | | | 414/416.07 |
| 5,738,487 A | * | 4/1998 | Schaede | B65D 19/0002 |
| | | | | 414/799 |
| 5,882,174 A | * | 3/1999 | Woerner | B65G 65/00 |
| | | | | 414/795.8 |
| 5,941,673 A | * | 8/1999 | Hayakawa | B23Q 7/103 |
| | | | | 414/225.01 |
| 6,290,448 B1 | * | 9/2001 | Focke | B65G 47/914 |
| | | | | 198/374 |
| 9,181,047 B2 | * | 11/2015 | Redman | B65G 59/067 |
| 2010/0272552 A1 | | 10/2010 | Xu et al. | |
| 2012/0163953 A1 | | 6/2012 | Murano et al. | |
| 2014/0195051 A1 | * | 7/2014 | Bonin | G05B 19/0428 |
| | | | | 700/253 |

* cited by examiner

ROBOTIC PALLETIZING

The present invention relates to the field of the palletization of products in an industrial mass-processing line and the subject matter thereof is, first, a particular palletization device and, second, a method implementing this device.

More particularly, the invention relates to low-speed lines in which the flow of product to be palletized is sufficiently slow for a human to be able manually to take charge of depositing the products one after the other on a pallet. This operation is currently performed manually, until a full pallet is obtained, the latter having superposed layers and each layer comprising a plurality of products or packages. Operators also intervene on a regular basis to remove a full pallet and/or to install an empty pallet. Moreover, this type of line generally has to fit in with a small footprint and prevent any risk for the operators working and moving along the line.

For these low-speed applications, there is currently a need to seek solutions that limit the use of operators, not only for reasons of safety, health, reliability and repeatability, but also for reasons of overall operating cost.

Palletization machines are already known in the prior art. For example, EP2964552, or alternatively EP1457442, describes a palletization machine in which the products are transferred in successive layers slid and then superposed on a pallet. Such equipment is particularly suited to products flowing at a markedly higher speed and is thus very largely over-sized and thus too expensive for slower speeds. Furthermore, the footprint is much too large for low-speed lines.

There are also known solutions that use multiaxial robots for gripping the products and depositing them in successive layers on a pallet, for example EP2186761 and DE202011100913. A major drawback remains, in that such a robotic solution represents a significant investment, in comparison with which manual work is more cost-effective. Furthermore, given safety conditions, such robots have to be surrounded by closed enclosures, with conditions on access. Indeed, their movements and their dimensions mean that they are hazardous for humans, in particular on account of potential impacts.

There are robot-based solutions that may be approached by humans and thus be freely accessible outside a closed enclosure. For example, US20080215597 discloses a solution for adjusting the operating speed of a robot dependent upon the proximity of a human. This then makes it possible to avoid movements of moving masses that are too fast, which could injure operators.

One of the drawbacks of such a solution of adjusting operation is that, in a low-speed line where a lot of operators are moving, in particular, as already stated, to unload an empty pallet and to take a full pallet, continuous detection may give rise to the robot operating in an extremely disrupted manner.

As regards the movement of pallets, non-manual solutions are already known: for example, US2014294553 describes a roller-based conveyor for bringing empty pallets one after the other into the zone where the products are deposited in successive layers, and U.S. Pat. No. 3,757,966, meanwhile, describes a roller-conveyor-based solution for removing a full pallet. Although this helps to reduce the need for an operator and cuts down on the disruptions that his movement causes for a robot that is adjusting its operation to a presence in its environment, this type of equipment is far too expensive as compared to manual working and requires a footprint that is incompatible with the requirements of low-speed lines.

Generally, conveyor-based solutions furthermore have the drawback that they are inflexible and difficult to adapt as a function of production requirements, which may necessitate different flow rates for each batch.

In this field of the palletization of products in superposed layers, each layer comprising a plurality of products, there is thus now a need to improve the existing situation described above by proposing equipment that makes it possible to reduce operator intervention in a low-speed line, said solution being, as far as possible, compact, simple, not costly, adaptable and/or reliable and fluid in operation.

To that end, the invention proposes the palletization of the products using a robot that is itself secure as it is located outside of a closed safety enclosure, depositing the products in successive layers on the top of a stack of a plurality of pallets. This significantly reduces operator intervention for depositing products on a pallet or for installing a fresh pallet.

A subject matter of the invention is thus a palletization device comprising, first, a freely accessible multiaxial robot for gripping and moving the products to be palletized and, second, at least one station arranged on the ground, for receiving the pallets on which the products are deposited.

This device is characterized in that the at least one station is designed to receive and to position-reference a stack of pallets one above the other.

A further subject matter of the invention is a method implemented by this device, namely a palletization method using a robot working in a free access zone, comprising steps consisting essentially in, first, gripping the products to be palletized one after the other in a reception zone and, second, moving the gripped products and depositing them on a pallet.

This method is characterized in that it comprises a depositing step during which the pallet on which the products are deposited rests on at least one other identical pallet within a station.

The invention will be better understood with the aid of the following description based on possible embodiments explained in a non-limiting, illustrative manner with reference to the appended figures, in which.

A subject matter of the invention is thus, first, a palletization device 1 comprising, first, a freely accessible multiaxial robot 3 for gripping and moving the products 2 to be palletized and, second, at least one station 5 arranged on the ground, for receiving the pallets 4 on which the products 2 are deposited.

The products 2 are preferably arranged on a pallet 4 in the form of a plurality of superposed layers, each layer having a plurality of products 2.

The device has no walls or grilles preventing or restricting access to the robot. Although the device might have walls around the robot, the latter is not in an entirely closed work zone to which access is controlled. The robot operates, therefore, in a work zone that is accessible to any operator intervening on the line. The palletization device 1 thus does not have a closed safety enclosure inside which only authorized operators are able to move. This type of robot 3, called a "collaborative" robot, is accessible to anyone, with no need for prior opening of the cage in which the robot 3 is working and which is often delimited by safety grilles.

The robot 3 is thus positioned outside of a closed or even access-restricted and/or controlled safety enclosure. Such a safety enclosure of this type would normally be intended to secure precisely the work zone of the robot and to prevent any operator from entering the work zone. Key, card, code or other types of access exist. In the invention, the work zone of the robot 3 is accessible to any operator and the robot 3 is intrinsically made safe, with no risk to persons in the surrounding area.

In certain applications, the robot 3 can work at sufficiently low rate for its speed not to constitute a hazard for the operators around it. In such cases, the robot cadence is not necessarily adjusted as a result of the detection of a presence in its vicinity, and the device may not have a detection system for the environment of the robot 3. In other configurations, the robot 3 is required to work at rates that represent potential risks for an operator with whom it would collide in the course of a movement. In such cases, since the robot 3 is outside of a closed enclosure and operators can therefore move in its work zone, the device 1 is preferably equipped with a system for surveillance of the work zone of the robot 3, this system being designed to signal a presence in the work zone for the purpose of modifying the operating speed of the robot 3.

According to the invention, the at least one station 5 is designed to receive and to position-reference a stack 6 of pallets 4 one above the other such that, aside from the case of the lower pallet 4 in the stack, there is no need, when a pallet 4 has been entirely filled, to bring the next pallet 4 into the station 5. This thus avoids using an operator, a machine or the like every time a full pallet 4 is removed.

Referencing is performed in the horizontal plane such that the robot 3 has no need to detect the precise horizontal position of the pallet 4 to be processed. Furthermore, referencing is performed by stops against which each pallet 4 in the stack 6 may arrive, such that position-referencing in the horizontal plane is performed simultaneously for each pallet 4. Even if the pallets 4 are initially slightly offset in the horizontal plane relative to each other within the stack 6 prior to its insertion and wedging in the station 5, they end up in this situation by virtue of being deposited at the bottom of the station 5, against corresponding stops.

Sensors may be provided that detect the correct positioning of each of the pallets 4 in the stack 6. These sensors may be coupled to the means for detecting a pallet 4 described below, in such a manner as to take account of the correct-positioning signal thereof only if a pallet 4 is actually present at the corresponding height.

In certain particular embodiments, the device, on the side of the at least one station 5, has an area on the ground that can receive at least one pallet 4. Thus, in the environment of the collaborative robot 3 a space is provided where it is possible to deposit a pallet 4 on which it will be possible to deposit products 2 during the short moments when the station 5 is unavailable. This supplementary zone is differentiated from the station 5 in that it may optionally be designed to receive and reference only one pallet 4 at a time.

According to an additional, possible feature, the device 1 comprises two side-by-side stations 5, the robot 3 being positioned between them such that, when the at least one station 5 is unable to receive products 3 and the robot 3 cannot therefore deposit a product 2 thereon, such as, for example, when the upper pallet 4 in the stack 6 of pallets 4 is full or in the event of an absence of a pallet 4 in said station 5, it is possible for it to deposit the products 2 elsewhere, particularly on the stack 6 present in the other station 5 or in the zone on the ground.

According to another additional, possible feature, the at least one station 5 has vertical walls 7 for referencing the stack 6 of pallets 4 that said station 5 can receive, extending over a height corresponding to a plurality of pallets 4, in particular four pallets, such that each pallet 4 in the stack 6 stored at the station 5 can be position-referenced by these walls forming stops upon insertion. It will be noted, here, that the pallets 4 are generally a standard size and that this height can thus be predicted as a function of the number of pallets 4 envisaged in the stack 6.

The walls 7 may be two in number, oriented perpendicularly relative to each other, defining a corner against which the stack 6 of pallets 4 can be referenced. In these particular embodiments, the station 5 has three vertical walls 7, two thereof being parallel to each other, the other being perpendicular thereto, the two parallel walls delimiting the lateral edges for the stack 6 and the third delimiting the back. These walls are sufficiently robust to withstand a butt-assembly force exerted by a machine depositing a stack 6 and pressing it against said walls. The walls are thus potentially reinforced with ties on the ground, as appropriate.

Preferably, the station 5 thus has, seen from above, a U-form, which delimits a rectangle defined by the periphery of the pallets 4 that it is able to receive and to reference, the U-shape potentially being, furthermore, flared at the opening in order to facilitate the insertion of the pallets 4.

The station 5 preferably also has stop means for a loader bringing the stack 6 of pallet 4. Indeed, as the stack 6 has to be rested against the walls 7 in order to be referenced against them, an excessive force or repeated impacts may damage the back of the station 5. A solution to this problem is to provide the station, at the level of the position to be adopted by the loader at the end of the movement bringing a stack 6, with a ground stop which will stop the loader sufficiently early to prevent, in particular, the end of the forks striking the station or, simply, an operator inserting the stack 6 too deeply or damaging the station 5 progressively. These stops stop the wheels but enable the forks to be inserted into the pallet 4 at the core of the station 5.

In certain embodiments, the at least one station 5 is equipped with a means for detecting the presence of each possible pallet 4 in the stack 6 that is the highest that the stack can receive. Preferably, the station 5 is designed at the top for receiving, with referencing, a predefined number of pallets 4 one above the other in a stack 6. This stack being placed on the ground or on a horizontal base of the station 5, and the thickness of a pallet 4 being normally standard, the detection means may comprise a plurality of detectors 8, each of which is designed to detect the presence of one of the possible pallets 4 in the maximum permissible stack 6. Different technologies of detector 8 are possible: laser, ultrasonic, infrared, or any other object-proximity detector, distance sensor or position sensor, etc. Optionally, each detector 8 is in the form of an optical detection cell with, on the one hand, a transmitter/receiver terminal and, on the other, a reflector terminal, said cell being arranged at the height of an expected pallet 4, the two terminals being positioned at the opposite ends of a diagonal of the rectangle formed by the station 5 for receiving the stack 6 of pallets 4. This increases the chances of the presence of a structural element of the pallet 4 between its two horizontal faces masking the detector 8 and thus permitting the detection of the pallet 4.

When the station 5 has walls 7 distributed as a U when seen from above and also a detection means in the form of a plurality of vertically distributed detectors 8, one for each possible pallet 4 in the pile, it is advantageous to provide openings or windows in the walls 7 for circulation.

According to another additional, possible feature, the at least one station 5 further has a means for detecting a tool for manipulating a pallet 4. This detection means is preferably positioned at the opening or mouth of the station 5, i.e. the branch that is missing from the U that it forms and a closed rectangle, and is in the form of a transmitter/receiver terminal and a reflector terminal, such that after the return of the signal in the wake of its interruption, a tool of the fork conveyor type can be deemed to be completely clear of the station 5.

In certain embodiments, the device 1 comprises a system detecting the correct alignment of the pallets 4. Thus, the station 5 has, at its mouth, detection equipment that preferably detects in a certain section of the mouth. In the event of the detection of an object beyond the zone envisaged for the pallet 4, i.e. a pallet 4 that does not arrive at the back stop, against the back wall 7, the device 1 concludes that an error has occurred. A simple implementation can consist in sweeping a section at the entry to the station 5, the detection of an object interrupting this section indicating that at least one pallet is not sufficiently pushed in and is thus incorrectly referenced. The device thus comprises a means for detecting incorrect referencing, at least against the back of the station 5, this means being located at the entry to the station 5 and capable of detecting a pallet 4 that is not far enough in. A solution based on a light-sensitive cell that scans, for example, a zone comparable to a thin vertical plane may be envisaged.

A further subject matter of the invention is a method implementing the device as described above, namely a palletization method using a robot 3 working in a free-access zone, comprising steps consisting essentially in, first, gripping the products 2 to be palletized one after another in a receiving zone and, second, moving the gripped products 2 and depositing them on a pallet 4, particularly placing a plurality of products 2 side-by-side, thereby forming successive layers ultimately superposed on said pallet 4.

In particular, the zone for receiving products 2 is located at the downstream end of a belt or roller conveyor. The method involves palletizing products 2, delivered continuously by a production line, in the form of superposed layers that each comprise a plurality of products 2 side-by-side.

According to the invention, the method comprises a depositing step during which the pallet 4 on which the products 2 are deposited rests on at least one other identical pallet 4 within a station 5, said pallets together forming a stack 6 position-referenced within the station 5. The stack 6 has been placed in the at least one station beforehand, that is to say before production starts. Thus, in the course of production, the operator has only to remove the successive full pallets 4 and the line is not interrupted for the period necessary for the installation of another pallet, above all if the latter has to be sought after the removal of the full pallet.

This method therefore offers a considerable advantage as compared to a method in which palletization takes place on a single pallet. In such a case, in the prior art improved by the invention, swapping of the pallet may take place in the following manner: arrival with an empty pallet, depositing of the empty pallet in a buffer zone, removal of the full pallet, depositing of the full pallet in a buffer zone, take-up of the empty pallet, depositing of the empty pallet, take-up of the full pallet, depositing of the full pallet downstream. Such a method limits movements between the store and the robot 3, but the changeover time is lengthy and two buffer zones have to be provided in the vicinity of the robot 3. Alternatively, the swapping method in the prior art may take place in the following manner: arrival with an empty pallet, depositing of the empty pallet in a buffer zone, seizing of the full pallet and depositing downstream, return to the buffer zone in order to take an empty pallet, and depositing of the empty pallet for palletization. In this case, too, the swapping step is significantly lengthy. Alternatively, again, swapping in the prior art may take place in the following manner, fetching the full pallet, depositing it downstream, fetching an empty pallet, bringing the empty pallet for palletization. Alternatively, again, use may be made of two different items of equipment in order first to clear the full pallet and then to deposit the empty pallet, but this is by far not optimum since it is then necessary to multiply the machine fleet and/or the number of operators in attendance.

By virtue of the invention, this type of swapping is simplified and made more fluid but without a requirement for multiple tools or other loaders for moving full or empty pallets.

Generally, the products 3 may be of flask, can, bottle or other type, but also boxes, cases, or the like. The products 3 are gripped and moved as a unit and the filling of a pallet 4 thus consists of a cyclical operation, during which a plurality of successive layers are created, each layer being formed from a plurality of side-by-side products 2, particularly with a different orientation of one relative to the other, for example with an at least quarter-turn rotation.

Thus, according to the invention, the robot 3 deposits the products 2 on a pallet 4 resting on another pallet that will be used during the next cycle. Naturally, the method also ends with the palletization of the last pallet 4, which is placed on the ground and is thus in a position that is normally well-known. Indeed, the precise thickness of a superposition of pallets 4 cannot be entirely predicted given that the dimensions of the pallets 4 are not very precise.

In certain embodiments, provision may be made for a manual operation, for example a recurring operation, of the type that adds a horizontal or, alternatively, vertical insert, a promotional object, an information sheet, etc.

According to another additional, possible feature, the method comprises a step consisting essentially in depositing, in a referenced manner within the station 5, a stack 6 of similar pallets 4, one above the other, it being possible for the pallet on the top then to receive the products 2 deposited by the robot 3. This step of simultaneously depositing a plurality of pallets 4 superposed in the form of a stack 6 may be performed with the aid of a vehicle controlled by a human, of the fork loader type, or with the aid of an autonomous vehicle, in which case the device is equipped with a corresponding central oversight unit for controlling at least said vehicle as a function of the fill status of the successive pallets 4.

In certain embodiments, the method comprises a step consisting essentially in removing, from the station 5, the upper pallet 4, namely the only or the highest pallet in the stack 6, once it has received the predefined quantity of products 2 and is deemed to be full. Given, particularly, the risks involved and the space required for the maneuvers of a machine used for this purpose, in light of the methods described above in the case of the prior art it will be understood that it is not advantageous to use this same machine of elevator loader type to also manage the empty pallet.

In particular embodiments, during the removal of the full pallet 4, the robot 3 deposits the product 2 on another pallet 4 within another station 5. The corresponding device then has at least two stations 5, it being possible for each to be used to receive and to reference, in a horizontal position, a stack 6 of pallets 4. The robot 3 may return to deposit products 2 in the first station 5 when the upper pallet 4, which is full, has been removed therefrom, or to finish the layer it has commenced in order to ensure referencing homogeneity or, alternatively, to entirely finish the pallet 4.

According to another additional, possible feature of the method, the pallets 4 in the stack 6 of the same station 5 are successively filled then removed, and then, after removal of the last pallet 4, the lowest pallet, the pallets 4 in the stack 6 of another station 5 are successively filled and then removed. Thus, the operator has all the production time corresponding to the filling and removal of the successive pallets 4 from a station 5 in which to deposit a stack 6 of pallets 4 in another station 5 in order to achieve continuous production.

Thus, the pallets 4 in stack 6 in one of the stations 5, from the topmost to the bottommost, and then the pallets 4 in another station 5 are successively loaded and then cleared. If the corresponding device 1 comprises only two stations 5, which is preferred, palletization alternates between two stations 5: all the pallets in one station 5 are palletized and then all the pallets in the other, etc.

In particular embodiments of the method, it comprises a step of detecting the height of the new pallet 4 on which the products 2 are to be deposited. Indeed, the pallet 4 that is to receive the products 2 may be placed on the ground or on an unknown number of pallets 4. At the start of the cycle of depositing on a pallet 4, and given the possible variations in thickness of the pallets 4 and the potential fragile nature of the products 2, it is thus preferable accurately to detect the exact height of the base surface from which the products 2 will be deposited in superposed layers of a plurality of products 2 each.

According to another additional, possible feature of the method, the height of the new pallet 4 is detected by the appearance of a vertical resistance at the time of depositing a product 2, preferably the first to be deposited on the pallet 4.

The robot 3 of the device 1, preferably the only one, in fact has a head for which resistance to movement is detected by the robot itself. Thus, after having gripped the first product 2 for the pallet 4, or even for the layer, the robot 3 performs a downward movement with a view to making a deposit. As soon as it encounters a resistance comparable to the presence of an obstacle, the product 2 may be deemed to be resting on the pallet 4 or on the layer below.

It will be noted that when the pallets 4 used are of precise dimensions, the value of the height of the receiving surface, that is to say the total height of the stack 6 and thus the precise position of the highest surface thereof, may be predefined and set in advance rather than detecting in the case of each pallet 4.

The palletization parameters, in terms of positions in a horizontal plane of the head of the robot 3 are taken, but at a different height. The palletization method for all the successive layers is staggered from the height detected for the pallet 4. Thus, the palletization cycle is repeated in the same way for each pallet 4, with the exception that the execution height thereof is adjusted for each cycle. The parameter representing the gripping height and the position in a horizontal plane are preserved, but the depositing height is adjusted in order to represent that which is actually detected. This makes it possible to simplify the palletization program. Naturally, provision may be made for modifications from one layer to another in order to reflect different palletization arrangements from one layer to another, for example in order to avoid fragile points in the full pallet 4. The palletization program repeated for each pallet 4 one after the other thus involves a variable that is modified automatically, on a cyclical basis, which corresponds to the height from which this cycle is to be repeated. Naturally, a more elaborate adjustment may be possible, in order to represent the exact position in the three directions from the cycle departure point and also the angles around these axes.

Figure 1:
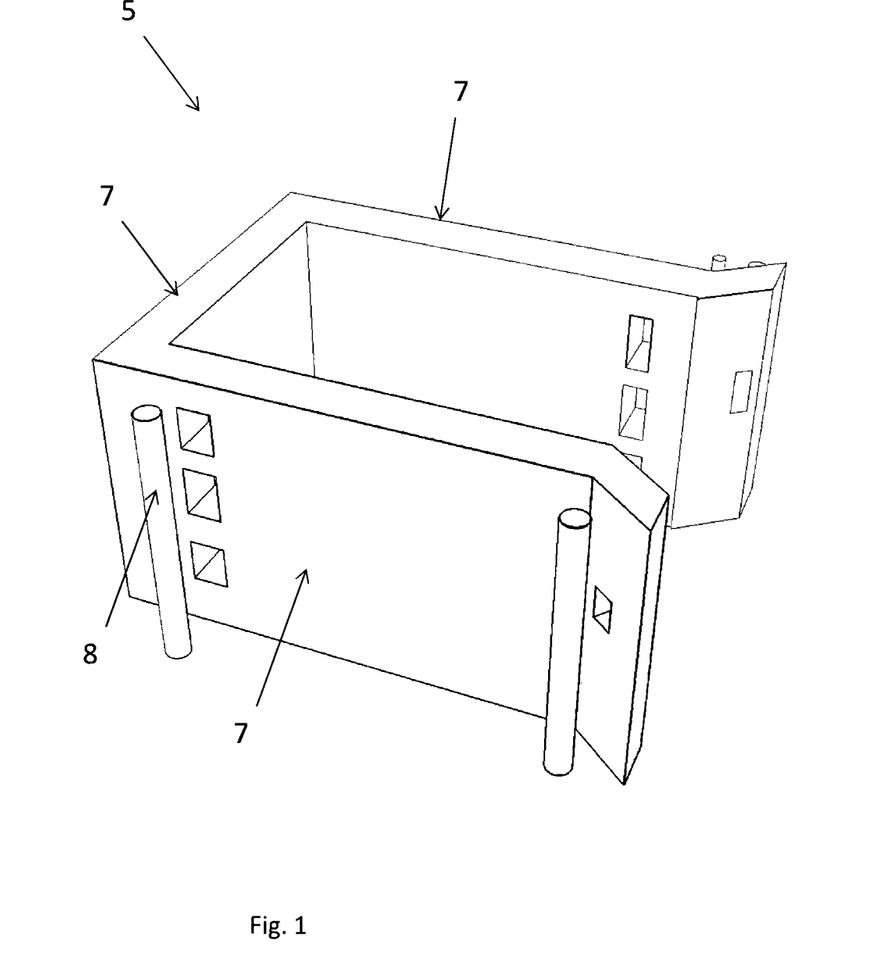
FIG. 1 shows a station in one embodiment of the invention.
Figure 2:
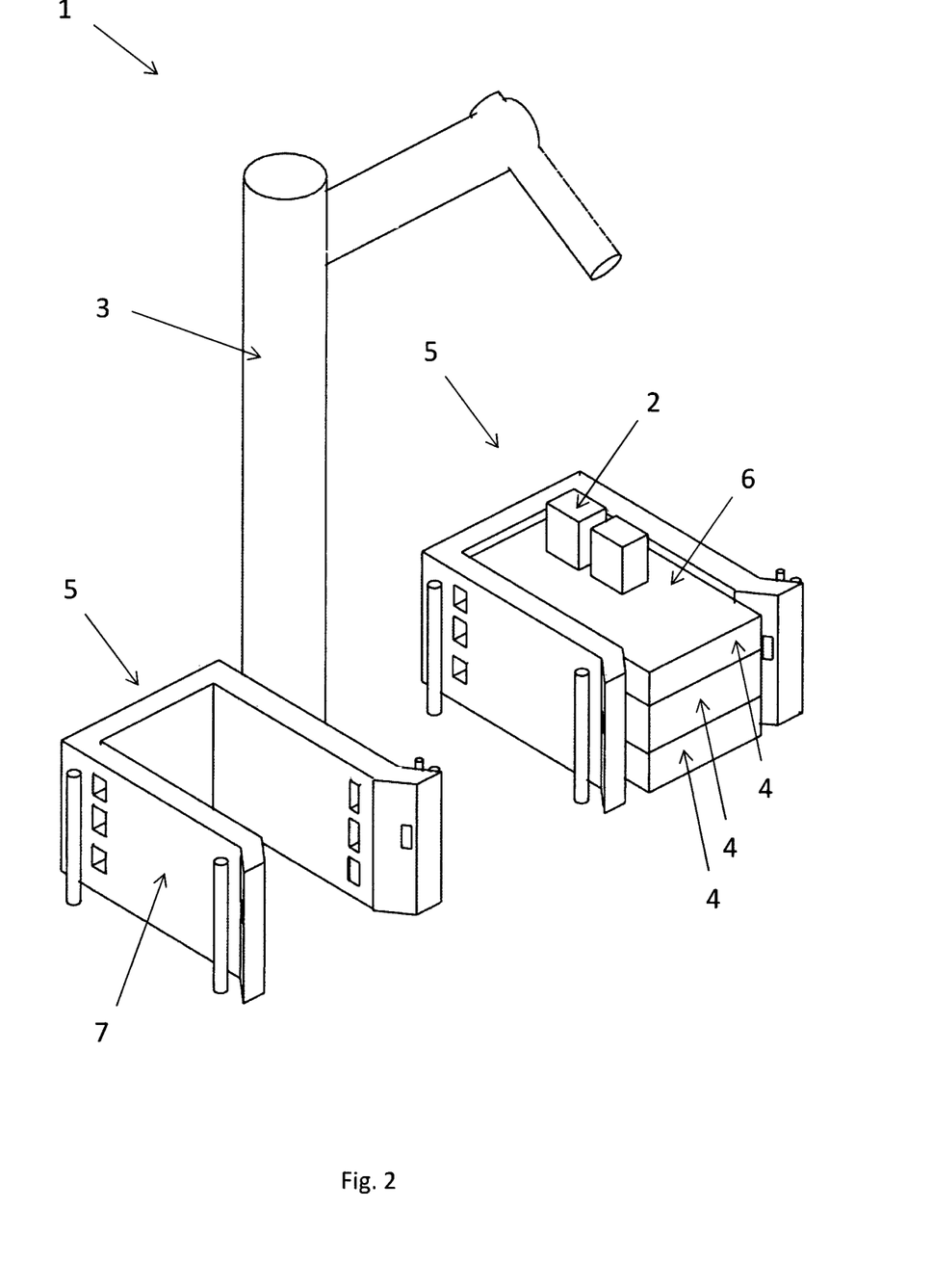
FIG. 2 shows a device with a robot and two stations, one being already loaded with a stack of pallets, and the other being empty.

In the embodiment illustrated in the appended figures, palletization device 1 is located downstream of a production line. This line continuously feeds products 2 of the case, box or other type, which the palletization device 1 is to deposit on a horizontal planar support, known as a pallet 4. The processed products are preferably of parallelepipedal form and self-supporting, that is to say they retain this shape in a stable manner.

The products 2 are deposited on the pallet planar support 4 in superposed successive layers, each layer normally being horizontal. Superposition is thus carried out in the vertical direction. Each layer comprises a plurality of products 2 side-by-side, arranged in a certain palletization arrangement that may change for each layer. Within one and the same layer, the products 2 may all be oriented in the same manner about the vertical axis, or turned relative to each other by at least one quarter turn.

The products 2 are supplied by the downstream line at an exit conveyor. This conveyor may be at the height of a man or may run at ground level. This exit conveyor may be motorized and thus actively entrain the products. Alternatively, the conveyor may allow the products to circulate freely through the effect of another force such as, for example, freely rotating rollers arranged along an inclined plane, a surface with a very low coefficient of friction on which the products 2 freely continue their circulation through the effect of their inertia, etc.

The palletization device 1 comprises a manipulator robot 3, the function of which is to deposit, in successive layers, the products 2 continuously issuing from the production line. The robot 3 is thus arranged at the downstream end of the exit conveyor. The robot 3 is a multiaxial robot, with arms connected successively one to another by an articulation with at least one degree of freedom each time. At the end of the robot 3, placed on the ground, there is a gripping head that can use sucker, pincer or other technology. The mobility of the robot 3 defines a possible zone of action for the gripping head. The robot 3 is located such that the exit conveyor circulates in the zone of action of the robot.

It will be noted that the stack 6 may be deposited directly on the ground, the station 5 having no horizontal support base but forming a solely lateral framework. Alternatively, the station 5 may be envisaged as offering a solution for keeping the stack 6 slightly offset from the ground, preferably such that the stack 6 extends from one and the same horizontal plane as the robot 3. For example, provision may be made for gutters along the edge walls 7 of the station 5. The gutters form a horizontal support surface on which the stack 6 may be deposited.

Furthermore, the device 1 has, in the zone of action of the robot 3, at least one station 5 that can receive a stack 6 of pallets 4 one above the other. It will be understood that the robot 3 is thus driven to grip the products 2 on the exit conveyor and to deposit them on top of the at least one pallet 4 constituting the stack 6. In preferred cases, the device 1 has two similar stations 5, arranged side-by-side, the robot 3 being positioned practically between them. It will be understood that, generally, the or each station 5 is in the zone of work of the robot 3, as is an end of the exit conveyor, preferably the terminal end thereof.

The device 1 has the particular feature that its robot 3 is permanently accessible to any person moving in the production workshop. The device 1 and, particularly, the robot 3 itself is thus equipped with a means guaranteeing the safety of people who may approach it while it is in operation. In the prior art of robotic palletization, use is generally made of cowlings, grilles or other protection walls, which delimit a space where no access is possible or where access is restricted, within which the robot works. Access restrictions are thus the prerequisite for safety.

In the device 1 of the invention, there is no restriction on access to the robot 3, which works at sufficiently low rates for contact with a human not to be hazardous to the latter. The robot 3 may, for example, also be equipped with a solution for detecting the force opposing its movement: in the event of an unexpected force, representing a potential impact against a human, the robot 3 stops, for example. It is also possible to envisage that the palletization device 1 is equipped with a means for detecting a presence in the environs of the robot 3, such as to adjust its mode of operation to any risks it represents to operators. Generally, it will be understood that the device according to the invention has no closed enclosure or enclosure within which it is possible to work subject to conditions, within which the robot 3 works. The environment of the robot 3 is thus not secured by a closed enclosure restricting access thereto.

Naturally, a wall may, for example, be provided in the immediate environment of the robot 3 in order to prevent, for example, regular passage by an operator in a circulation zone or to prevent a presence being detected and adversely affecting the operation of the robot 3 on a continuous basis.

The at least one station 5 of the device 1 in the work zone of its robot 3 allows receiving and horizontal position-referencing of a plurality of pallets 4 superposed one above the other.

Indeed, in the invention, the operator does not bring one pallet 4 at a time in order for it to receive products 2 gripped by the robot 3; rather, he brings a plurality of pallets 4, one above the other, aligned in plan view. As will be further described below, palletization will then consist in successfully filling and clearing each of the superposed pallets 4.

The station 5 is preferably placed on the ground and has guides, stops or, alternatively, vertical walls 7 against which the pallets 4 are position-referenced. This abutment solution, by means of a wall or the like, for example for the vertical axes, defines a receiving zone of rectangular form when seen from above. The pallets 4 in a stack 6 are arranged in this receiving zone. Naturally, these guides are used to define the position of the superposed pallets 4 and thus extend over a sufficient height, forming at least three stops against which the pallets can bear and thus be referenced.

In a preferred embodiment, the station has three vertical walls 7, two being mutually parallel and forming the edges and one being perpendicular thereto, forming the back wall. The pallets 4 in a stack 6 are then inserted in the station 5 by means of a movement parallel to the edge. Indeed, seen from above, the station 5 has a U-form, the two branches of which are formed by the edge walls 7 and the core of which is formed by the back wall 7. The end of the branches of the U opposite the core of the U define a mouth for the station 5. Preferably, this mouth is flared and widens away from the back wall, in order to facilitate the insertion of the pallets.

Preferably, the walls 7 extend from the group or from close to the ground. Thus, the lowest pallet 4 is at ground level, while the highest pallet 4, which receives the products 2, is naturally at a height dependent upon the number of pallets 4 in the stack 6.

The station 5, in particular these guides, stops or walls 7 against which the pallets 4 are pressed in order to be position-referenced for compatibility with the settings of the robot 3, extend over a sufficient height for each pallet 4 in the stack 6 to be position-referenced. Preferably, a station 5 may receive at least three pallets 4, or even five or six, and the height of the station 5 is adapted. It will be understood that the position-referencing of the pallet 4 extends in a horizontal plane and that this referencing is necessary to prevent the robot 3 having to detect the position of the pallet 4 prior to depositing products 2 thereon. This horizontal referencing repeated for each successive pallet in the stack 6 and for each successive stack 6 is performed by the station 5 and implemented by bringing the stack 6 against it, until it is in contact with the guides, stops or other walls 7 that define the receiving zone.

A stack 6 is inserted via a normally horizontal planar movement parallel to the edges of the station 5. Use is generally made of equipment with forks, which, once the stack 6 has been deposited, are parallel to the edges of the station.

It will be understood that, at the start of a cycle, a stack 6 of pallets 4 is brought to and deposited in the station 5. The latter may, furthermore, be used to finalize the superposition of the pallets since it makes it possible to reference each pallet in the same way. The highest pallet 4 in the stack 6 receives the successive products 2 from the robot 3 and then, once it contains all the layers and is thus full, it is cleared. The depositing of the products 2, or palletization, is thus carried out at levels dependent on the number of pallets 4 in the station 5.

It is then necessary to detect the number of pallets 4 actually present in the station 5 before the robot 3 commences depositing products 2. Detection of the exact height of the surface on which to deposit the products 2 will be described below.

The device 1 is thus equipped with a means for detecting the presence of a pallet at a plurality of successive heights, each corresponding to a height where there would be a pallet 4 if the stack 6 were high enough.

In a preferred embodiment, the station 5 has three referencing walls 7, forming stops, which delimit the contours of the zone where the pallets 4 are simultaneously received in the form of a stack 6. The detection means mentioned above thus has a plurality of successive detectors 8, each dedicated to a possible height of a pallet 4. The detector 8 preferably operates, on the basis of an optical principle, between two terminals. The absence of a signal between the two terminals represents a present pallet 4. If the signal flows between the two terminals, the pallet 4 is then deemed to be absent. It is possible to imagine a terminal as transmitter and receiver, the other terminal being a mirror or else a transmitter terminal, the other being a receiver, etc. Laser solutions can also be envisaged. Generally, the detector 8 detects an object at a predefined height relative to the horizontal base of the station on which the stack 6 is placed.

To ensure that the presence of a pallet 4 between two terminals is indeed detected, it is preferred to use terminals arranged on the bias relative to the sides of the horizontal rectangle occupied by the stack 6. With a pair of terminals aligned parallel to one of the sides of this rectangle, there is a risk that openings under the pallet 4, which are used to manipulate it, allow the signal to pass between two terminals and thus prevent detection. In a simple embodiment, the two terminals are positioned at the ends of a diagonal of the horizontal rectangle occupied by the stack 6.

In a possible embodiment, the detection means comprises a plurality of detectors 8, each in the form of a pair of terminals, i.e. a first terminal and a second terminal. The device 1 then has, at the level of the station 5 and outside the walls 7, two vertical axes, i.e. a first axis and a second axis, each approximately at the level of an end of a diagonal of the rectangle occupied by the stack 6. All the first terminals are mounted on the first axis and all the second terminals are mounted on the second axis. The walls 7 against which are located axes that receive the terminals, situated beyond the interior of the U formed by the station 5, then have suitable openings for causing an optical signal to flow between the first terminal and the second terminal of each detector 8 comprising a pair of terminals. A single window may be produced for all the terminals mounted on one and the same axis or, alternatively, one window per terminal, etc. Preferably, the position of the first axis and/or of the second axis can be modified and the terminals can be adjusted in terms of position on their axis.

As already mentioned, the palletization cycle consists in depositing, on the pallet 4 present in the station 5, or on the uppermost pallet 4 in the stack 6 present in the station, a predetermined quantity of products 2 with a predetermined configuration, then in removing from the station the pallet 4 that is then full, continuing with the pallet 4 below.

A full pallet 4 is generally removed with a tool having forks, and palletization is preferably resumed only once this tool has departed. It is thus necessary to detect the departure of this tool, which also represents the free state of the volume above the stack 6 for further palletization.

In a preferred manner, the arrival and then the departure of an object in the zone traversed by the tool is thus detected for insertion of the forks under the pallet 4 sought. As already specified, the station 5 preferably has a U-shape seen from above and thus has a mouth through which the pallets 4 in the stack are horizontally slid. This mouth is not normally closed off by palletization. The tool for removing the full pallet 4 approaches the stack 6, however, via this mouth and its presence and its departure may thus be detected thereat.

Thus, in a preferred manner, the device 1 has a presence detection means at the level of the mouth of the station 5. This detection means is preferably optical and associates a presence with cutting off the signal between its two terminals and an absence with the existence of a signal between its terminals, said terminals being placed one on one side and the other on the other side of the mouth.

Here, also, windows may be provided in order that the walls 7 of the station 5 do not prevent the signal from circulating while the terminals are beyond the walls delimiting the receiving zone of the station 5.

Once the highest pallet 4 in the station 5 is full, the swapping step is initiated, during which said pallet 4 will be removed, while the robot 3 does not operate in line with this same pallet 4. A signal may thus be generated to indicate the possibility of implementing this swapping. The tool with forks then arrives and blocks the corresponding detection means located in the mouth of the station 5 which forms the only location for approaching a pallet 4 horizontally, and then clears the full pallet 4. When it is sufficiently withdrawn, the tool no longer blocks the corresponding detector. This passage of the detector from blocking to circulation, following a signal for a full pallet 4, makes it possible to ascertain that a full pallet 4 has been cleared and the robot 3 can resume palletization on the new pallet 4 that was previously under the full pallet. Naturally, where the full pallet 4 that has been removed was the last pallet 4 in the stack 6, a representative signal may be transmitted in order at least to prevent the robot carrying out palletization directly on the ground.

Provision may be made for palletization to resume after the lapsing of a period of time following the restoration of the signal after it has been blocked by the removal tool.

During removal of a full pallet 4, different operating states of the robot 3 are possible. The robot 3 may, first, be placed on standby and not transfer new products 2. This can be envisaged in particular when the pallet 4 just removed was the last pallet 4 in the stack and the device 1 has no other available receiving surface or station 5. Alternatively, the robot 3 may continue to palletize the products 2 on another pallet 4, in particular the pallet 4 in a stack 6 in another station 5, the only pallet 4 in a station 5, a pallet 4 provided on another receiving surface, a buffer pallet 4 or the like.

In cases where the robot 3 continues to carry out palletization while a tool is in the course of removing the full pallet 4 from the work station 5, palletization in this same station 5 may resume as soon as a new pallet 4 is available in the station 5, irrespective of the palletization state created in the interval, as soon as a new pallet 4 is available in this station 5, and a whole number of layers has been palletized in the interval, or, alternatively, as soon as a new pallet 4 is available in this station 5 and complete palletization has been effected in the interval.

At the start of a cycle of palletization on a pallet 4 in a station 5, or on the highest pallet 4 in the stack 6 in the station, it is preferable to detect precisely the exact height of the receiving surface, i.e. the upper surface of said pallet. Indeed, although a pallet 4 is an item with normally standard dimensions, the actual thickness thereof may vary, particularly as a function of wear, partial breakages, etc. This lack of precision mounts up in a stack 6 and simply being aware of the number of pallets 4 present in the station 5 is not enough in order to know precisely the height at which the robot 3 is to deposit the product 2.

It should be noted, here, that it is preferable for the robot 3 to release the product 2 only when the latter is very close to the receiving surface, that is to say the pallet on which it is to be deposited, this being to avoid incorrect placements, product breakages, noise caused by falling, etc.

The device 1 thus detects the actual height of the surface on which it is to deposit the products 2. In a simple manner, use may be made of a robot 3 equipped with a force sensor, which quantifies the resistance opposing the movement of the gripping head. When depositing the first product 2, the robot 3 may thus be maneuvered in order to arrive at a very low downward speed toward the pallet 4 and to detect the moment at which resistance increases significantly, which thus corresponds to the actual position of the upper receiving surface of the pallet 4.

Once the actual height of the receiving surface has been detected, the robot 3 then autocalibrates. In effect, it repeats the same palletization cycle but at a height different from the previous height. It will be noted that this cyclic calibration is normally performed only for the vertical axis, the horizontal position of the pallet 4 normally being guaranteed by the station 5 itself, in particular the edges, stops or other walls 7 thereof.

In possible configurations, the device 1 has a station 5 that is able to receive a plurality of pallets 4 in the form of a stack 6. It may further have another receiving surface for at least another pallet 4 for times when the station 5 is unable to receive a product 2. This receiving surface may be provided by a station 5, in which case the device 1 is equipped with two similar stations 5, it being possible for each then to receive a plurality of pallets 4 superposed as a stack 6. The presence of more than a plurality of pallets 4, that is to say the presence of a plurality of stacks 6, guarantees a high level of autonomy for the palletization device 1. It suffices periodically to remove the full pallet 4, without the need to bring back an empty pallet 4 or a plurality thereof in order to ensure the continuity of the method.

The palletization method may comprise the following steps.

A plurality of pallets 4 superposed as a stack 6 are all brought simultaneously to the single station 5, which was hitherto empty, and referenced at the same time against the stops, such as walls 7, of said station 5. The robot 3 then loads the highest pallet 4 in the stack, product after product, forming a pallet of layers of products. Once the upper pallet 4 is full, the robot stops placing products 2 thereon and removes the full pallet. Optional operation of the robot 3 during this phase of non-availability of the single station has been described above. Once the full pallet 4 has been cleared and the station 5 can once again receive products 2, the robot 3 resumes its palletization activity in said station 5. It will be understood that the pallet 4 on which it is loading the products 2 is the last pallet or not the last pallet. This pallet 4 in the stack 6 is successfully palletized and then removed. The method ends once all the pallets 4 in the stack 6 have been filled and removed. It then resumes by means of a new stack 6 being received.

By virtue of dead periods during which the robot 3 is unable to deposit product 2 in the station 5, another pallet 4 may be progressively formed. When the environment does not permit receipt of a second surface on the ground for palletization, the robot 3 goes into standby mode. It will be noted that, in such a case, since the station 5 already has a plurality of pallets 4, the dead time for which the robot 3 is waiting thus corresponds solely to the removal of the full pallet 4. The next pallet 4 is already available and there is no need to wait for a new pallet 4 to be deposited instead and in place of the preceding pallet. Furthermore, movements of the tool that brings an empty pallet are significantly reduced, since it is unnecessary to bring an empty pallet 4 every time a full pallet 4 is removed.

The method may also be based on a device 1 with two stations 5, it being possible for each station to receive a plurality of pallets 4 forming a stack 6. For the requirements of the explanation, a first station 5 and a second station will be described.

The method begins with the supply, to the first station 5, of a stack 6 of pallets 4 by an operator, an automaton, a robotic means, or even a conveyor for pallets 4, etc. Once the first station 5 is ready to receive products 2, the robot 3 commences to deposit products 2 thereat, on the highest pallet 4 in the stack 6. Once this pallet 4 is full, it is removed. Once the highest pallet 4 in the stack 6 of the first station 5 is full, it is possible, as already stated, either to place the robot 3 on standby, in particular when the second station 5 is not operational owing to the absence of a stack 6 or owing to an upper pallet 4 there, also, being full, or to use the robot 3 to deposit the products 2 in the second station 5. There, also, the robot 3 is able to continue palletization in the second station 5 until the first station 5 is once again operational, following which it will immediately commence palletizing at the first station 5 until it has palletized a whole number of layers in the second station 5, following which it will commence to palletize at the first station 5, or, alternatively, until the pallet 4 in the second station 5 is entirely full and ready to be removed. It will be understood that, except for this latter case, palletization takes place by means of successively filling and discharging each pallet 4 from the first station 5, optionally with progressive filling of a pallet 4 in the second station 5 when there is dead time when the first station cannot be used.

Once the first station 5 has been emptied, the robot 3 swaps to the second station 5, which is normally capable of receiving products 2, either on an entirely empty pallet 4 or on a pallet comprising a whole number of finished layers, or a pallet comprising just a few products. Any products 2 present in the second station 5 having been deposited previously by the robot 3, the latter is able to resume palletization without necessarily having to identify in advance the exact configuration of that upon which the products 2 are to be placed, since it is already aware of that configuration.

The pallets 4 in the stack at the second station 5 are successively filled and cleared, in a manner similar to the processing described above for the first station 5.

In the event that the step of filling and discharging a pallet 4 in the second station 5 is initiated when the upper pallet of the first station 5 is full, and is executed from start to finish despite renewed availability at the first station 5, the method involves filling and then successively clearing a pallet 4 from each station 5 alternately.

It will be understood that autonomy, considered to be the possibility of allowing the method to function without having to provide a new pallet 4 for it, is significantly enhanced, all within a reduced footprint.

Lastly, in certain embodiments, the palletization device 1 comprises more than two stations 5. They may be arranged, for example, in an arc of a circle around the base of the robot 3 whereby the latter rests on the ground. The method is essentially the same as that described above in the case of two stations, that is to say filling and discharging the upper pallet 4 from one of the stations 5, possibly with a pallet 4 being filled during dead times. Successive pallets 4 may originate from the same station 5, from different stations 5 one after the other, or any other relevant series inspired by automated management of the system.

It will be noted that successively emptying one station 5 after another leaves sufficient time to bring a new stack 6 of pallets 4 and avoids arriving at a situation in which all the stations 5 are out of operation. A station 5 has the time to be filled again with a new stack 6 before all the others are unavailable, which guarantees continuous functioning.

Lastly, irrespective of the number of stations 5 designed to receive a plurality of superposed pallets 4, and if space so permits, the device 1 may also comprise a zone in which a buffer pallet is provided to ensure continuity of the method when the or each station 5 is unavailable because an upper pallet 4 is full, a pallet 4 is absent, or the like.

A stack 6 may be brought to the base of a station 5 for position-referencing purposes, for good cooperation with the robot 3, by an autonomous vehicle during its course and/or at its start-up, depending on the requirements of the method, or by a vehicle controlled by an operator. The same applies in the case of the removal of a full pallet 4.

By virtue of the invention, it is thus possible significantly to reduce the total intervention time required by an operator. There is no need to have a buffer receiving zone for receiving the next empty pallet thereat, brought on the occasion of the course followed in order to fetch the full pallet. Furthermore, swapping is much more rapid than if an empty pallet is brought beforehand: it is, in effect, unnecessary, in order to resume palletization, to wait for the removal tool to have deposited the future pallet 4 in such a buffer receiving zone, to have cleared the full pallet 4 and then to have delivered the new pallet 4. This thus significantly reduces the space required for upstream palletization storage. Lastly, bringing a plurality of pallets 4 simultaneously makes it possible significantly to reduce the movements to be performed in a workshop, whether by an operator or by an autonomous machine.

Although the above description is based on particular embodiments, it in no way limits the scope of the invention and modifications may be made thereto, particularly by substituting technical equivalents or by a different combination of all or some of the features described above.

The invention claimed is:

1. A palletization device (1) comprising:
a multiaxial robot (3) for gripping and moving the products (2) to be palletized the robot (3) being in a freely-accessible work area and,
at least one station (5) comprising three vertical walls (7) that form a U-shape and define a reception area arranged on the ground in the work area of the robot (3), said reception area for receiving the pallets (4) on which the products (2) are deposited, the at least one station (5) comprising a detector (8) configured to detect the presence of each pallet (4) in the highest stack (6) that it may receive,
wherein:
the at least one station (5) is configured to allow the pallets (4) to be (i) vertically stacked to a maximum height one above the other beginning at the ground and (ii) position referenced in a horizontal plane for each pallet (4) in the stack (6),
the robot being configured to deposit products (2) on a top pallet (4) of the vertically stacked pallets, and
the at least one station (5) further comprises a sensor arrangement to detect the presence of the maximum height of the vertically stacked pallets.

2. The device as claimed in claim 1, further comprising, beside the at least one station (5), a zone on the ground that can receive at least one pallet (4).

3. The device as claimed in claim 2, wherein the at least one station (5) has vertical walls (7) for referencing the stack (6) of pallets (4) that said station (5) can receive, extending over a height corresponding to a plurality of pallets (4).

4. The device as claimed in claim 1, the device (1) further comprising two stations one beside the other (5), the robot (3) being positioned between them.

5. The device as claimed in claim 4, wherein the at least one station (5) has vertical walls (7) for referencing the stack (6) of pallets (4) that said station (5) can receive, extending over a height corresponding to a plurality of pallets (4).

6. The device as claimed in claim 1, wherein the at least one station (5) has vertical walls (7) for referencing the stack (6) of pallets (4) that said station (5) can receive, extending over a height corresponding to a plurality of pallets (4).

7. A palletization method using a robot (3), comprising:
providing an apparatus of claim 1,
gripping the products (2) to be palletized one after the other in a reception zone,
moving the gripped products (2),
depositing the products (2) on a top pallet (4) positioned within a station (5) arranged on the ground in a freely-accessible work area of the robot (3), the station (5) having vertical walls (7) that define a reception area shaped and sized for a stack (6) and the vertical walls (7) are used configured to align the pallets (4) within the station (5),
wherein, the top pallet (4) on which the products (2) are deposited has at least one other identical pallet (4) within the station (5) and
the depositing occurs in a referenced manner in a horizontal plane for each pallet (4).

8. The method as claimed in claim 7, wherein depositing in a referenced manner within the station (5) further comprises a stack (6) of similar pallets (4), one above the other, wherein the top pallet is configured to receive the products (2) deposited by the robot (3).

9. The method as claimed in claim 8, further comprising removing an upper pallet (4) from the station (5)-once the upper pallet has received the predefined quantity of products (2), wherein the upper pallet (4) is the highest pallet in the stack (6) or the only pallet in the stack (6).

10. The method as claimed in claim 7, further comprising removing an upper pallet (4) from the station (5) once the upper pallet has received the predefined quantity of products (2), wherein the upper pallet (4) is the highest pallet in the stack (6) or the only pallet in the stack (6).

11. The method as claimed in claim 10, wherein during the removal of the full pallet (4), the robot (3) deposits the products (2) on another pallet (4) within another station (5).

12. The method as claimed in claim 11, wherein the pallets (4) in the stack (6) of one and the same station (5) are successively filled and then removed, and then, after removal of the last pallet (4), which is the lowest pallet, the pallets (4) of the stack (6) of another station (5) are successively filled and then removed.

13. The method as claimed in claim 10, wherein the pallets (4) in the stack (6) of one and the same station (5) are successively filled and then removed, and then, after removal of the last pallet (4), which is the lowest pallet, the pallets (4) of the stack (6) of another station (5) are successively filled and then removed.

14. The method as claimed in claim 7, further comprising detecting the height of the new pallet (4) on which the products (2) are to be deposited.

15. The method as claimed in claim 14, wherein the height of the new pallet (4) is detected by the appearance of a vertical resistance when a product (2) is deposited.

* * * * *